E. T. HATTON.
NOSE RING.
APPLICATION FILED MAR. 20, 1918.
1,276,215.
Patented Aug. 20, 1918.
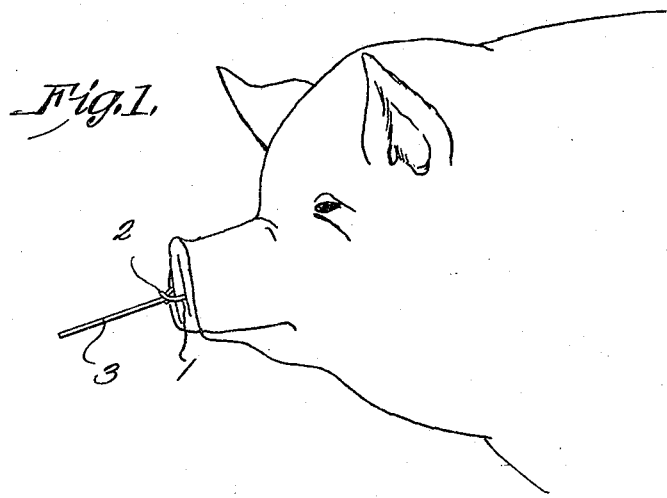
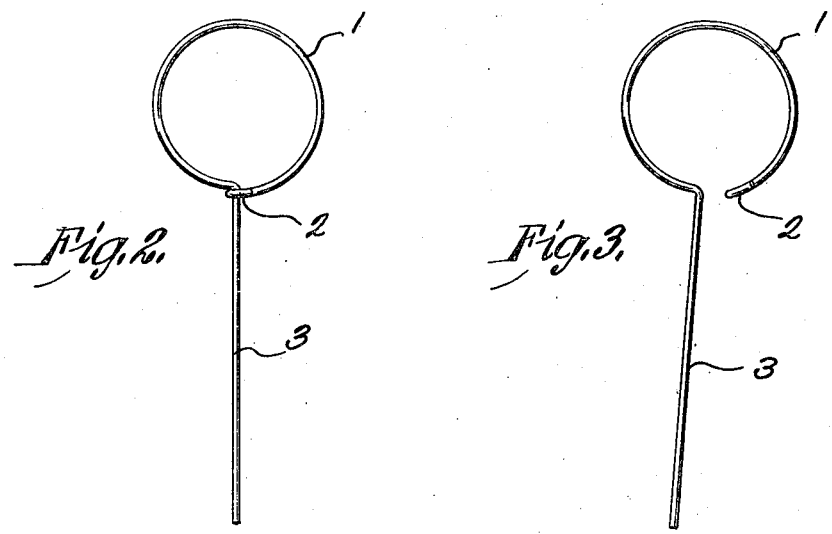
WITNESSES
R. W. Hoagland
S. M. McColl
INVENTOR
Elmer T. Hatton,
BY Richard B. Owen.
ATTORNEY

UNITED STATES PATENT OFFICE.

ELMER T. HATTON, OF ITHACA, NEW YORK.

NOSE-RING.

1,276,215.　　　　　　Specification of Letters Patent.　　Patented Aug. 20, 1918.

Application filed March 20, 1918. Serial No. 223,592.

*To all whom it may concern:*

Be it known that I, ELMER T. HATTON, a citizen of the United States, residing at Ithaca, in the county of Tompkins and State of New York, have invented certain new and useful Improvements in Nose-Rings, of which the following is a specification.

This invention relates to improvements in nose rings, and has particular application to a nose ring for hogs.

The object of the invention is to provide a simple cheaply constructed device of this character for attachment to the noses of animals for training, restraining and protective purposes and is capable of performing the double function as a preventer to keep hogs from catching chickens as well as to prevent them from rooting. The device is also constructed so animals wearing it may be led thereby in a manner similar to a bull ring.

Another object is to provide a device of this character which may be quickly applied and removed and will effectually perform its intended functions without subjecting the animal to undue discomfort when in use, and without interfering with the animal's feeding or other proper and normal actions.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a perspective view showing the device in use,

Fig. 2 is a plan view of the device detached in closed operative position, and

Fig. 3 is a similar view showing the device open.

In the embodiment illustrated, the device is preferably composed of a continuous strip of material such as a length of resilient heavy wire, bent in annular form as shown at 1 with a hook 2 at one end and an arm 3 projecting radially from its other end. This arm 3 extends substantially at right angles to the ring-shaped or annular member 1 and the hook 2 is designed to be engaged with said arm at its juncture with ring 1, as is shown clearly in Fig. 2. After this hook has been so engaged with the arm, it is clenched down to close it and prevent accidental separation thereof from said arm, this, of course, being done after the device has been placed in the nose of the animal as shown in Fig. 1.

The arm 3, as shown in the drawings, is disposed in the same plane as the ring 1 so that when said ring is inserted in the partition wall of the animal's nose, this arm will extend longitudinally forward, and yet be capable of a slight vertical swing to permit the animal to feed without interference thereby.

The device is applied by first piercing the partition wall of the animal's nose with a suitable instrument, then passing arm 3 through the pierced partition until the ring 1 is positioned as shown in Fig. 1. The hook 2 is then snapped into engagement with the arm 3 at its inner end and said hook is clenched so as to prevent all possibility of its becoming accidentally disengaged from the arm. The device is then ready for use.

When in use, the arm 3 projecting forwardly will prevent the animal from rooting and should he attempt to pursue a fowl through grass or bushes with its head down, as is usually the case, the arm 3 will become entangled in the grass or bushes thereby impeding the animal's progress and also by pushing back against his nose will cause him to stop. Should he, however, succeed in approaching a fowl, even upon bare ground, the forwardly extending arm 3 will operate to push the fowl away and prevent the mouth of the animal from getting sufficiently close to grasp the fowl with its teeth, thus affording means of escape for the fowl. It will be seen, however, that the device having a slight vertical movement will not interfere in any way with the normal feeding of the animal as when the animal lowers his head to the ground or trough, the device will swing upwardly a sufficient distance to permit him to eat or drink.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

A nose ring constructed of a single wire bent to form a circular open loop with one end extended radially outward to form an arm and its other end bent laterally in a plane at right angles to the plane of the loop to provide a hook to detachably engage said arm at its inner end.

In testimony whereof I affix my signature in presence of two witnesses.

ELMER T. HATTON.

Witnesses:
EVELYN WILKINSON,
MARGARET HATTON.